United States Patent [19]

Kivel

[11] 4,179,272

[45] Dec. 18, 1979

[54] LASER ISOTOPE SEPARATION USING SELECTIVE INHIBITION AND ENCOURAGEMENT OF DIMER FORMATION

[75] Inventor: Bennett Kivel, Melrose, Mass.

[73] Assignee: Jersey Nuclear-Avco Isotopes, Inc., Bellevue, Wash.

[21] Appl. No.: 820,621

[22] Filed: Aug. 1, 1977

[51] Int. Cl.² .......................... B01J 1/10; B01D 1/00
[52] U.S. Cl. ................................ 55/1; 204/DIG. 11; 204/157.1 R
[58] Field of Search .............................. 55/2, 17, 23; 204/DIG. 11; 423/19; 250/527

[56] References Cited

U.S. PATENT DOCUMENTS

| 4,024,217 | 5/1977 | Wexler et al. | 204/DIG. 11 |
| 4,025,790 | 5/1977 | Jeffer et al. | 204/DIG. 11 |
| 4,032,306 | 6/1977 | Lee | 204/DIG. 11 |
| 4,039,411 | 8/1977 | Woodroffe et al. | 204/DIG. 11 |

*Primary Examiner*—Howard S. Williams
*Attorney, Agent, or Firm*—Weingarten, Maxham & Schurgin

[57] ABSTRACT

Method and apparatus for inhibiting dimer formation of molecules of a selected isotope type in a cooled flow of gas to enhance the effectiveness of mass difference isotope separation techniques. Molecules in the flow containing atoms of the selected isotope type are selectively excited by infrared radiation in order to inhibit the formation of dimers and larger clusters of such molecules, while the molecules not containing atoms of the selected, excited type are encouraged to form dimers and higher order aggregates by the cooling of the gaseous flow. The molecules with the excited isotope will predominate in monomers and will constitute the enriched product stream, while the aggregated group comprising molecules having the unexcited isotope will predominate in dimers and larger clusters of molecules, forming the tails stream. The difference in diffusion coefficients between particles of the excited and unexcited isotopes is enhanced by the greater mass differences resulting from aggregation of unexcited particles into dimers and larger clusters. Prior art separation techniques which exploit differences in isotopic diffusion rates will consequently exhibit enhanced enrichment per stage by the utilization of the present invention.

59 Claims, 6 Drawing Figures

LASER ISOTOPE SEPARATION USING SELECTIVE INHIBITION AND ENCOURAGEMENT OF DIMER FORMATION

FIELD OF THE INVENTION

This invention relates to isotope separation and, in particular, to enhanced isotope separation by laser-induced excitation of one isotope to inhibit dimer formation and further aggregation of molecules comprising such isotope while the formation of dimers and larger clusters of molecules having isotopes to be distinguished therefrom is enhanced.

BACKGROUND OF THE INVENTION

Present day production level uranium enrichment, i.e. separation of the U-235 isotope, is achieved by what is commonly known as the gaseous diffusion technique. According to known aspects of this technique, molecules of uranium hexafluoride ($UF_6$) are forced under pressure through sets of small holes or channels in a diffusion screen which constricts the flow of the uranium hexafluoride gas and very slightly affects its flow rate in accordance with molecular weight. Thus, the flow rate through the channels will be a function of isotope type, permitting a small, typically a fraction of one percent, enrichment per stage. The enrichment is typically improved by cascading several stages using both feedback and feedforward systems between waste and product streams, respectively.

The very small mass difference between the atoms of different isotope types making up the uranium hexafluoride molecule and even smaller total relative mass difference between the complete molecules places a limit upon the difference in diffusion rates which may be achieved for the isotopically distinct molecules. This limit is, as indicated above, very small and necessitates the cascading of many stages of diffusion channels if uranium is to be enriched from its naturally occurring concentration of about 0.7% up to approximately 2-4% for typical use in power-generating reactors.

Another approach to uranium enrichment is that described in U.S. Pat. No. 3,772,519, which utilizes differences in radiation absorption frequency between isotope types, particularly of elemental uranium, to permit ionization of particles of one isotope type so that a separation may be created electrically.

A different approach to uranium enrichment, also using lasers, but for vibrational excitation as opposed to ionization, is shown in U.S. Pat. No. 3,996,470, issued Dec. 7, 1976 and U.S. Pat. No. 4,039,411 issued Aug. 2, 1977, both assigned to the same assignee as the present application. In these applications, as in the present invention, finely tuned, radiant energy from a laser is applied to diffusing molecules to induce a vibration in the molecules having atoms of a selected isotope type. The isotopically selective vibrational excitation permits more efficient isotope separation than in diffusion techniques generally. More particularly, where diffusion rate is the operative factor to induce separation among the isotope types, the applied radiant energy and resulting vibrational excitation of the gaseous molecules of the selected isotope type can be made to adjust the accommodation coefficient of the molecules flowing through diffusion channels, whereby the molecules of the vibrationally-excited isotope will accommodate or stick less readily to the channel walls, and thereby diffuse at a higher rate than the unexcited isotope. Isotopically selective vibrational excitation has also been described as producing a conversion from vibrational to translational excitation of the selected isotope type molecules by collision with the molecules of an inert carrier or background gas so that separation may be accomplished by exploiting the difference in translation between the molecules of the selected isotope type and of other molecules of the same components but different isotopes.

BRIEF SUMMARY OF THE INVENTION

In accordance with the teaching of the present invention, an isotopic mixture of molecules having components of a selected isotope type is cooled to a temperature at which dimer formation and molecular aggregation can occur and which also enhances the ability to selectively excite the desired isotope. A radiation source, such as a laser or a source of filtered radiation, is then used to excite molecules of the desired isotope by, typically, about one quantum level, to inhibit the formation of dimers and the aggregation of larger molecular groupings in particles comprised of the selected isotope type. The monomer population of the mixture is thereby enriched in molecules composed of the desired isotope. Consequently, diffusion rates for particles composed of the desired isotope will be significantly higher than for those composed of the unexcited isotopes, because such particles will now differ in mass by a factor significantly greater than the mass difference of the atoms of the isotopes, and, consequently, the monomers alone. Added to this effect is the enhanced diffusion rate of the monomer due to deactivation to translational energy of its higher level of vibrational energy. Extraction of the particles of the selected isotope type may then be accomplished by any conventional method for separating particles operable on gross differences in mass, such as partial condensation, centrifuge techniques or mass diffusion.

BRIEF DESCRIPTION OF THE DRAWING

These and other features of the present invention are more fully set forth below in the detailed description of the preferred embodiment and the accompanying drawing of which.

DESCRIPTION OF THE PREFERRED EMBODIMENT

The present invention contemplates a system for improving the efficiency of isotope separation processes operable to achieve separation by exploiting isotopic mass differences, by inducing a state of low level, vibrational excitation in molecules containing atoms of one isotope type in an environment in which molecules of all types have been cooled to the point of dimerization. The vibrational excitation is typically induced by laser irradiation of a gaseous environment of molecules containing atoms of plural isotope types of a common element, typically uranium. The gaseous mixture to be irradiated is first cooled to below the point where the gaseous molecules will aggregate, forming dimers and other higher order clusters of molecules. Cooling also concentrates the atoms of plural isotope types into their ground energy state which facilitates selective isotope separation. Such selective excitation of the atoms of the desired isotope type imparts vibrational energy to the molecules containing such atoms, inhibiting the formation of dimers or other aggregates of such molecules. Typically, a low level of excitation is used, sufficient only to inhibit dimerization and enable the use of known separation techniques, but not so much as to appreciably excite atoms of other than the desired isotope type. Thus, the excited, vibrating molecules are both of greater energy and considerably lighter than the aggregated molecules containing atoms of other isotope types. These large mass differences permit an enhancement in mass dependent separation of the isotopically distinct molecules compared to prior selective excitation methods.

The laser excitation employed to produce a vibrational excitement of the molecules in the present invention is to be distinguished from laser-induced excitation of electron energies in atoms or molecules as, for example, represented in U.S. Pat. Nos. 3,443,087 and 3,772,519. In the latter, laser excitation, typically of a substantially higher frequency, is employed to produce a transition in the energy state of, for example, a uranium atom by forcing an outer orbitable electron to step to a more remote electron orbit, and ultimately to an ionized state through radiation absorption or other mechanisms. In the present invention, laser radiation is employed to produce vibration of molecular atoms from energy imparted by photon absorption by the molecule. The laser radiation absorbed by the molecule induces a vibrational excitation of the atoms of the molecule, such as by oscillation of the molecule's elements about their molecular bond forces. In this sense, the laser excitation can be viewed as inducing a strictly mechanical oscillation of the molecule. For this result, the laser is preferably selected for its capability of being tuned to a specific frequency which will vibrationally excite the molecule. Additionally, the laser is adjusted so that its output wavelength is suitably defined and band-limited to provide isotopic selectivity of the molecules that are vibrationally excited. In the case of uranium hexafluoride, isotopic selectivity in vibrational excitation of the molecule is possible because of the slight mass difference between the U-235 and U-238 atoms which comprise one atom of the seven atom uranium hexafluoride molecule. The properties of the molecule which permit mechanical harmonic oscillation are described by the second order differential equation relating atomic mass and molecular bond restraint. Since the masses for the different uranium isotopes differ by the isotope mass difference, the harmonic oscillation frequencies for vibrational excitation of the molecules will differ accordingly.

In this case, the uranium hexafluoride molecule is of particular interest due to the fact that each molecule contains but one atom of the element whose isotopes are to be separated. Were there to be more than one atom of that particular element, there would be a proliferation of the number of absorption lines where the desired isotope type occurred in different percentages in each molecule, and there could be less clear distinction between the frequencies for absorption lines. Also, fluorine, having only one isotope, is particularly adapted to compounding with uranium in such applications.

Excitation frequencies for this purpose are known as, for example, presented in C. Paul Robinson and Reed J. Jensen, "Some Developments in Laser Isotope Separation Research at Los Alamos", American Physical Society Meeting, February 2-5, 1976, New York, New York; and lasers, such as lead salt diode lasers or $CO_2$ based tunable lasers, capable of exciting selectively are also known as shown, for example, in H. R. Fetterman, H. R. Schlossberg, and W. E. Barch, "Optically Pumped 15.90 Micron $SF_6$ Laser." See also, in general, U.S. patent applications Ser. Nos. 690,910 and 690,911, both filed May 28, 1976 and assigned to the same assignee as the present invention.

The present system typically is for the enrichment of uranium using a uranium hexafluoride gas in combination with a noble gas, such as argon. In the preferred embodiment, a subsonic cryogenic flow of molecules of uranium hexafluoride in combination with the carrier or background gas of a noble element, such as argon, is directed through a cooled chamber that is illuminated by laser radiation tuned to vibrationally excite the uranium hexafluoride molecules of a specific uranium isotope type, typically U-235, to an excited vibrational state. Prior enrichment schemes, such as that disclosed in U.S. Pat. No. 4,039,411, teach the use of a density of the background or carrier gas which is preferably maintained substantially higher than the density of the uranium hexafluoride to provide a higher probability of collision of the vibrationally-excited molecules with a background molecule than with an unexcited uranium hexafluoride molecule, to exploit the conversion of the excitation energy into a translation of the excited molecule in order to bring about a higher diffusion rate for molecules with the desired isotope. The lower the density of uranium hexafluoride, however, the lower the yield of the desired isotope type, assuming other relevant parameters to be constant. The present invention is premised on collisions of the $UF_6$ molecules to form dimers of the unexcited molecule. It therefore operates more efficiently when the density of uranium hexafluoride is substantially (e.g., an order of magnitude) higher, than for example, in the collision-limited separation situation. Consequently, increased yields are possible according to the present invention; or, alternatively, processing plant size can be reduced to provide the same degree of enrichment; or both.

Similarly, in both of the above-identified patent applications, aggregation and condensation of molecules limit the efficiency of the isotope separation methods therein, whereas in the present invention, that very effect is exploited in order to provide a more substantial mass difference between molecules having atoms of the excited and unexcited isotope types.

Figure 1:
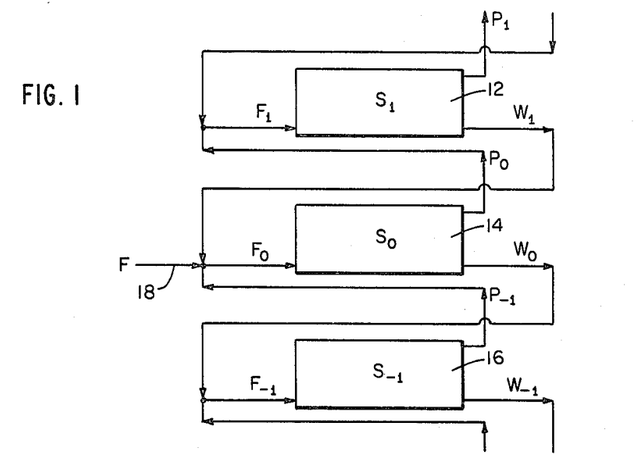
FIG. 1 is a system block diagram showing possible staging arrangements for multi-stages isotope separation employing techniques of the present invention.

With these considerations as background to the invention, the exemplary apparatus and processes for implementing it may now be described with reference to the drawings. In particular, in the process of the present invention, it may be desirable to employ several enrichment stages in a cascaded fashion, each receiving an input of gaseous phase molecules (e.g., $UF_6$) and providing an enriched output or product stream, as well as a depleted or waste output stream. The enriched stream may be applied to the next higher order enrichment stage, and the depleted stream applied to the next lower order enrichment stage. Such a general scheme is illustrated with respect to FIG. 1. Shown there are a plurality of stages 12, 14 and 16 ($S_1$, $S_0$ and $S_{-1}$), representing only three stages in a multi-stage enrichment plant. As shown in FIG. 1, the gaseous state molecules are applied through a feed line 18 ($F_0$) and a center stage 14 ($S_0$). The feed ($F_0$) to stage 14 is a mixture of the feed line 18 (F) with the waste line $W_1$ of stage 12 ($S_1$), and product line $P_{-1}$ of stage 16 ($S_{-1}$). The product output of stage 14 ($P_0$) is applied ahead to the next higher order stage 12 ($S_1$), along with a depleted output, $W_2$, from the previous next higher order stage, $S_2$, not shown. The feed line $F_1$ to stage 12 ($S_1$) is the combination of the waste line output $W_0$ of stage 14, and the product line output $P_{-2}$ of the stage $S_{-2}$, not shown. As many stages either side of stage 14 may be employed as desirable for the total system enrichment. The total enrichment is the individual stage enrichment factor raised to the power of the number of stages in the chain.

Figure 2:
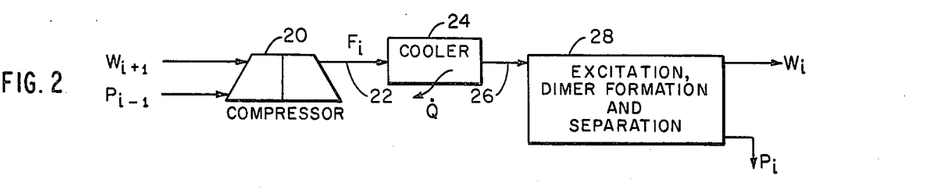
FIG. 2 is a system block diagram of a single stage according to the present invention.

In a first exemplary implementation of the system according to the present invention, each stage in the chain illustrated in FIG. 1 will typically contain the components illustrated in FIG. 2. The adjacent stage, waste and product feed inputs, generally represented by the quantities $W_{i+1}$ and $P_{i-1}$, are applied to respective different ports of a compressor 20. The $P_{i-1}$ gaseous flow may be at a lower pressure than the $W_{i+1}$ flow and accordingly will be applied to the compressor 20 at different pressure points to provide an output flow $F_i$ in line 22, representing a mixture of the waste and product input flows at the appropriate pressure. Flow line 22 is applied to a cooler stage 24 which may typically include a heat exchanger coil adapted to remove heat at a rate Q so as to provide a flow output in a line 26 at a defined temperature for all stages. The temperature in this conduit 26 is controlled to maintain a gaseous state for excited and unexcited molecules flowing therein, with the temperature being sufficiently high, such as approximately 200°–250° K. to prevent condensation. In a subsequent excitation and dimer formation stage 28, the operation of which is illustrated more fully in FIG. 3, a gas expansion nozzle or other cooling means lowers the thermal energy of the gases to approximately 50°–150° K., or just below the condensation temperature for uranium hexafluoride molecules, which condition initiates the formation of dimer and higher order aggregates of such molecules. This low temperature also insures that a high percentage of the $UF_6$ molecules will be in the ground vibrational stage and that the width of the rotational Q branch, at which the excitation will be applied, is narrower than the shift or separation between the 235-$UF_6$ and 238-$UF_6$ isotopes.

Figure 4:
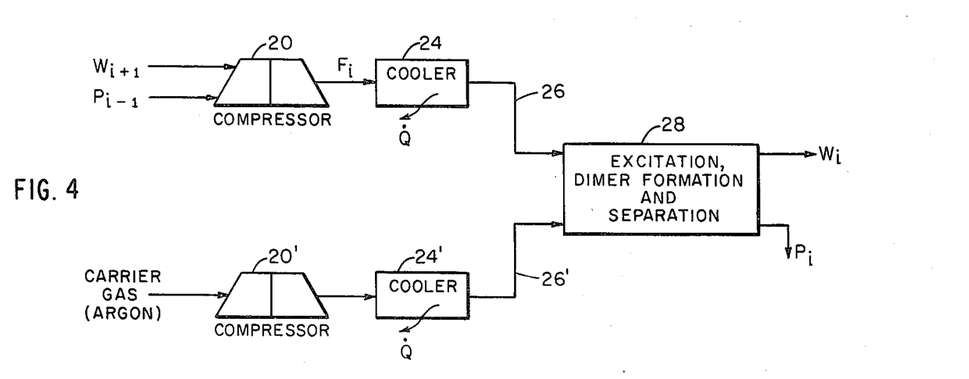
FIG. 4 is a system block diagram of a single stage according to the present invention, showing cooling by mixing with a carrier gas.
Figure 5:
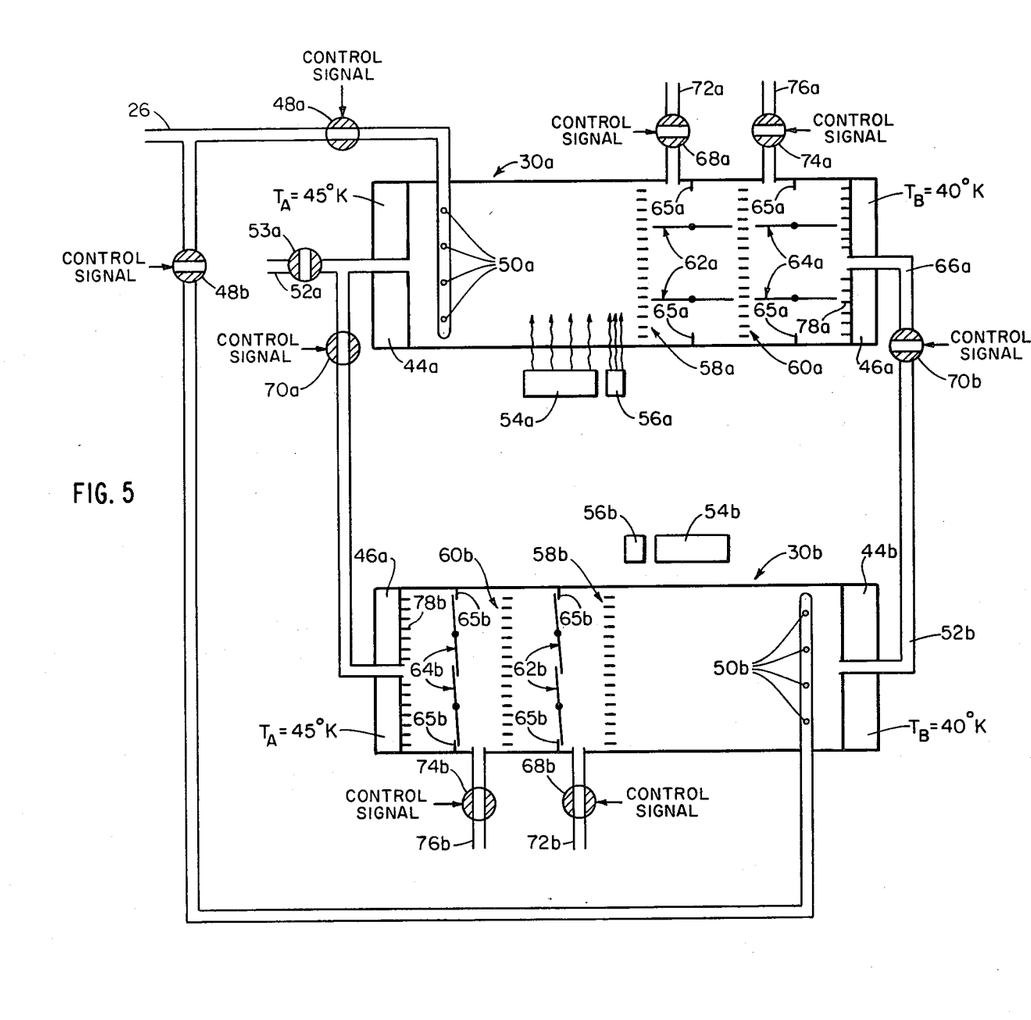
FIG. 5 is a diagrammatical ilustration of one embodiment of apparatus suitable for producing the present invention.

While one specific method for cooling the gas has been described above, i.e. compression followed by a heat exchanger and a gas expansion nozzle, several other conventional techniques are suitable. It is specifically contemplated, for example that, as illustrated in FIG. 4, the $UF_6$ gas may be cooled by admixing with a noble, carrier gas, such as argon, maintained at a lower temperature than the $UF_6$ gas. In the embodiment of FIGS. 4 and 5, this is accomplished by cooling the gaseous $UF_6$ mixture in the compressor-heat exchanger of FIG. 2 and separately cooling the argon gas in a similar apparatus comprised of compressor 20′ and cooler 24′. As specifically illustrated in FIG. 4, it should be noted that the argon is provided to stage 28 via a separate conduit 26′ at a temperature substantially lower than that of the $UF_6$ gas, typically being on the order of 50° K. Both conduits 26 and 26′ feed excitation and dimer formation stage 28, wherein their mixing causes the temperature of the $UF_6$ to be lowered. Further details of this cooling technique are provided in FIG. 5, which is more fully discussed below.

Regardless of the mechanism employed, the $UF_6$ is vibrationally deactivated by cooling. A low flux laser is employed to illuminate the 235-$UF_6$ containing gas with low intensity radiation (as illustrated by photon 40 in FIG. 3). This radiation is provided in the infrared spectral region of approximately 16 microns and is precisely tuned to a vibrational absorption line for one of the uranium isotopes in the hexafluoride molecule, typically the U-235 isotope, which will be vibrationally excited on the Q branch thereof. This maintains the 235-$UF_6$ in the monomer state while the 238-$UF_6$ molecules cool and aggregate into clusters of molecules.

Optionally, a second, higher flux laser may be employed to illuminate the region between the region illuminated by the first laser and the collection apparatus (discussed below), to enhance the kinetic speed of the U-235 monomers. It is estimated that the separation factor when employing solely the first, low-flux laser is approximately $1 + \Delta M/M$, while it increases to $1 + \Delta M/M + \Delta T/T$ when both lasers are employed, where $\Delta M/M$ is the difference in dimer and monomer mass divided by the monomer mass and $\Delta T/T$ is the difference in dimer and monomer temperature divided by the monomer temperature.

In the described embodiments, a laser has been shown as the source of the excitation radiation. Both lead salt diode lasers and $CO_2$ lasers are suitable for providing narrow band radiation at the required wavelengths, the latter being preferred. Optionally, more than one dimer inhibition laser may be employed, either being identically tuned to a single Q branch resonance for the 235-$UF_6$ or suitably displaced in frequency to follow the anharmonic resonance shifts with vibrational excitation in 235-$UF_6$. Also to be noted in this regard is that the laser(s) to be used for the excitation beam(s) may emit radiation having a relatively large spatial extent normal to the beam without encountering the need for refocussing, as occurs in such circumstances with some schemes utilizing kinetic separation techniques. Additionally, radiation may be supplied by sources other than lasers, such as, for example, filtered radiation obtained by passing broadband unfiltered radiation through a pure gas of 238-$UF_6$ which is cooled to a temperature comparable to that of the working fluid and which thereby absorbs radiation which can excite the 238-$UF_6$ molecules while transmitting radiation which can excite 235-$UF_6$.

Photons of the particular energy provided by the laser(s) are absorbed with a given probability by one of the types of molecules present in the gaseous flow, in particular, those containing the U-235 isotope. The laser excitation in the photon employed to produce a vibrational-rotational excitation of the molecules in the present invention is to be distinguished from laser-induced excitation of electron energies in atoms or molecules as, for example, represented in the above-referenced U.S. Pat. No 3,772,519. As described below, the laser is adjusted so that its output wavelength is suitably limited to provide isotopic selectivity in the molecules that are vibrationally excited. In this case, the isotopic selectivity produces vibrational-rotational excitation of uranium hexafluoride molecules containing the U-235 isotopes without corresponding excitation of molecules containing the other, predominantly U-238 isotopes. The low temperature in the region in which the excitation is applied will produce dimerization and aggregation of the unexcited U-238 containing molecules. The U-235 containing molecules will not dimerize or aggregate to any significant degree if excited on the order of one or slightly more quantum levels. Thus, the monomers will predominate in the U-235 isotope, while the larger molecules will predominate in the U-238 isotope. The aggregated molecules comprising at least dimers and possibly larger groupings will be correspondingly more massive than the monomers and will consequently exhibit a significantly lower diffusion rate.

In contrast to the foregoing embodiment utilizing a subsonic, cryogenically pumped flow, it is also possible to accomplish the required cooling by means of supersonic expansion techniques. For example, supersonic expansion may be used to transform a gaseous argon-$UF_6$ mixture, in a 10 to 1 density ratio, from an initial pressure and temperature of 1 atmosphere and 350° K. to a cooled pressure and temperature of 0.01 atmospheres at 100° K. Under these conditions, the optical depth in the Q branch of the molecules containing U-235 is about 20 cm and the dimer formation region's length is about 40 cm. Laser excitation is applied substantially coextensive with this region in order to ensure sufficient time for the 238-$UF_6$ dimers to form. This means, however, that the 235-$UF_6$ will have to be excited a substantial number of times over such a distance, to replace energy lost by vibrational deactivation; as many as a few hundred excitations being needed. Laser flux of about 10 w/$cm^2$ over a chamber about 0.5 meter in length and 0.1 meter by 0.1 meter in cross-section will provide the necessary conditions.

Separation may be achieved by the use of any suitable technique operative on mass differences, diffusion rate differences or differences in vibrational energy. The partial condensation method, for example, is usable. In this method, the condensed fraction is the tail stream which is depleted in 235-$UF_6$. The non-condensed, vapor stream contains more of the monomers and, hence, is enriched in the 235-$UF_6$ product. As an alternate method, one can stop the reaction after the radiation has been applied, by expansion which freezes the dimer formation, or by adding warm gas or utlizing thermal conduction to heat the separation region and thereby slow the rate of dimer formation. The reaction can also be stopped by the addition of a diluent. Conventional techniques can then be used to separate the product and tail streams by means operative on the mass differences of the particles, such as mass diffusion or centrifuge techniques.

One particularly suitable separation technique is illustrated diagrammatically in FIG. 5. Briefly, the system shown there comprises a pair of excitation, dimer formation and separation chambers 30a and 30b arranged with appropriate valving to permit continuous operation such that one of such chambers may be used for selective excitation and separate collection of uranium hexafluoride gas isotopes while previously collected product and tails material is removed from the other chamber. As an added benefit, argon collected in the latter chamber is recirculated for use as the carrier gas supply for the chamber which is engaged in separation. When the product and waste materials have been removed from the second chamber, the valving permits the roles of the chambers to be reversed.

Each of the chambers 30a and 30b being of like construction, the structure of only one will be described, it being understood that such description is intended to apply to both. For this reason, all designating numerals relating to chamber 30a will be suffixed by the letter "a" and the corresponding elements of chamber 30b in the figures will be identified by the same numeral suffixed by the letter "b." Chamber 30a is shown as functioning in the active processing or separating mode of operation, while previously collected materials are being removed from chamber 30b. Temperature controllers 44a and 46a are provided, respectively, at first and second ends of chamber 30a to maintain both of said ends at desired cryogenic temperatures. Typically, controller 44a will maintain the first end of the chamber at a temperature, $T_A$, of about 45° K., controller 46a will maintain the second end of the chamber at a slightly lower temperature, $T_B$, of about 40° K. Since $T_A$ is greater than $T_B$, the condensed gas at second end 46b of chamber 30b will enter the first end of the chamber 30a through valve 70a and be cryogenically pumped, or induced to flow, toward the second end of that chamber. Conduit 26 is used, as previously explained, to supply the $UF_6$ gas to chamber 30a at the first end thereof, via valve 48a and porous pipes 50a. Initially, and as needed, the carrier gas (e.g. argon) is introduced into the first end of the chamber as, for example, via a pipe 52a and valve 53a.

As the argon-uranium hexafluoride mixture flows toward the second end of the chamber, it is illuminated by a first, low-flux laser 54a which, as explained above, excites the 235-$UF_6$ molecules and inhibits dimer formation therein while the 238-$UF_6$ molecules aggregate into clusters. A second, higher-flux laser is positioned "downstream" of the first laser, further exciting the 235-$UF_6$ monomers in order to enhance their kinetic speed and temperature prior to collection. This increased temperature will raise the diffusion rate of the desired isotope and thereby increase the enrichment of the product.

A first plurality of condensing plates 58a are provided between the lasers and the second end of the chamber. As previously described in the patents and/or patent applications cited above, the lighter, excited particles (i.e. the monomers) will diffuse more rapidly than the heavier, non-excited particles and thus exhibit an enhanced condensation on the plate surfaces. This will provide the product stream upon subsequent removal from the plates. The degree of isotopic separation will be a maximum in the vicinity of the ends of the plates closest to the excitation region of the chamber, with a separation gradually decreasing along the length of the plates. It is apparent, therefore, that plates 58a should be as short as possible to provide the best separation, but as long as possible to collect a maximum amount of the desired isotope. As a practical matter, a suitable compromise between these conflicting objectives is achieved by making the plates long enough to collect about 30% of the excited particles. The remainder which flows uncondensed passed the first set of plates 58a will predominate in depleted monomers and aggregates of 238-$UF_6$ and will form the tails or waste component. A second plurality of condensing plates 60a is provided "downstream" of the plates 58a, for condensing this component.

Plates 58a and 60a may either comprise individual sets of parallel plates, as illustrated, or two mutually perpendicular sets of parallel plates. The advantage of the mutually perpendicular sets of parallel plates is the reduced length of flow required for condensing the desired fraction of the product. This is desirable both to reduce apparatus size and also to produce a more efficient separation of particles. By reducing the required flow length, there is a concomitant reduction in the time during which the excited and unexcited particles can interact in the gaseous flow; such particle interaction results in a decrease of selectivity due to energy loss by the excited particles and is, therefore, undesirable. In either case, for good performance it is believed that plates 58a should be placed so as to collect the product soon after significant dimer formation has occurred, but before significant condensation takes place.

An additional set of plates or fins 78a is provided to increase the collection area for condensed argon and the small amount of residual $UF_6$ not collected on plates 58a and 60a.

Two sets of rotating vanes or flow-obstructing members 62a and 64a are also shown in FIG. 5 within the chamber 30a. When the valves are arranged such that chamber 30a is being used for excitation and separation, vanes 62a and 64a are disposed to present a minimal cross-section to the gaseous flow therein. After the processing has continued for a suitable time and a desired quantity of 235-$UF_6$ has been collected on plates 58a, vanes 62a and 64a are rotated to bear against sealing walls 65a so as to isolate each of the sets of plates 58a and 60a. On-off valves 48a, 48b, 70a and 70b are reversed in state at this time; that is, valves 48a and 70a are turned off, and valves 48b and 70b are turned on. This may, for example, be automatically accomplished in response to a control signal(s) generated by suitable process monitor and control apparatus, the particular design of which is not part of this invention. The chamber may then be heated, either by simply diminishing the cooling or by applying heat from an external source. Argon which has built up at the second end of chamber 30a, as on plates 78a, for example, may then be pumped, by the resulting temperature differential, out conduit 66a, through valve 70b and conduit 52b into the first end of chamber 30b, as its argon source. The tails and product materials are then exhausted from chamber 30a by any satisfactory arrangement, as, for example, by opening valve 68a to permit removal of the product via conduit 72a and opening valve 74a to permit removal of the tails via conduit 76a.

It is to be appreciated that lasers 54a and 54b may comprise a single laser with suitable optics for directing the output beam to whichever one of chambers 30a and 30b is operating in the processing mode at a given time, and that the same is true for lasers 56a and 56b.

While the precise dimensions used are not critical, chambers 30a and 30b may typically be on the order of 1 meter in length and 0.5 meters by 0.5 meters in cross-section. Operating pressures within the chambers should typically be in the range of $1 \times 10^{-5}$ to $3 \times 10^{-3}$ atmospheres, and, preferably, about $3 \times 10^{-4}$ atmospheres.

Figure 3:
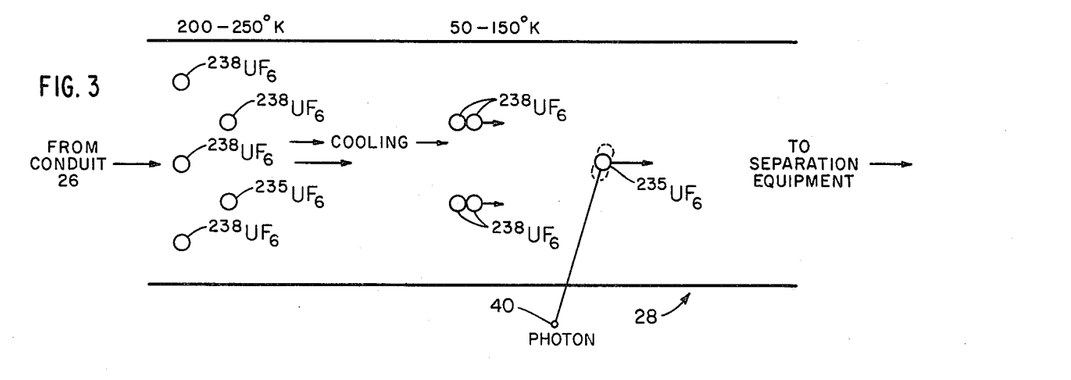
FIG. 3 is a diagrammatic representation of isotopically selective dimer formation and inhibition in the manner of this invention.
Figure 6:
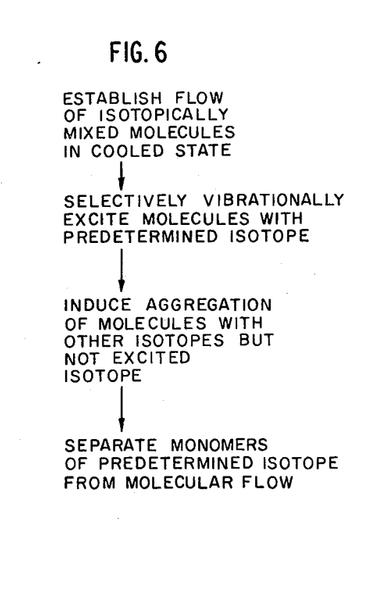
FIG. 6 is a flow diagram depicting the steps required for isotope separation using dimer inhibition according to this invention.

Having thus described the invention in detail, it will be appreciated that FIG. 6 provides a summary of the process of isotope separation by inhibition of dimer formation as generally explained in connection with FIG. 3 and as more fully embodied in the designs of FIGS. 4 and 5. It is to be realized from the foregoing description and figures that while FIG. 6 is provided in the form of a sequential series of operative steps, two or more of such steps may be performed either concurrently or in a sequence other than that illustrated while still being within the intended scope of the invention.

The present invention is not to be construed as limited to the specific embodiments described above, but extends to the modifications of and alternatives to this exemplary teaching which fall within the scope of the following claims.

What is claimed is:

1. A method for producing mass dependent isotopic separation among molecules having an atom present in plural isotope types, the method comprising the steps of:

establishing a flowing environment of the molecules having an atom thereof present in several isotope types;

inducing isotopically selective vibrational excitation of the molecules of said flowing environment so as to produce molecular vibration of molecules having an atom of a predetermined isotope type without correspondingly inducing vibration of molecules having an atom of another isotope type;

inducing aggregation of the flowing molecules having atoms of an isotope other than the predetermined isotope type to form clusters of such molecules while substantially avoiding the formation of dimers and larger clusters of molecules having an atom of the predetermined vibrationally excited isotope type, whereby the selectively excited molecules predominate in monomers; and separating the selectively excited monomers from the flowing environment of molecules.

2. The method of claim 1 wherein the step of inducing aggregation of the flowing molecules having atoms of other than the predetermined isotope type comprises cooling the flow of molecules to a temperature of about the temperature at which condensation of the flowing gas commences.

3. The method of claim 1 wherein said molecules include a gaseous compound of uranium.

4. The method of claim 1 further including the step of collecting the selectively excited monomers on a surface.

5. The method of claim 4 wherein the surface for collecting the excited monomers comprises a plurality of spaced, parallel plates.

6. The method of claim 5 wherein the plurality of parallel plates comprising a first plurality of spaced, parallel plates and a second plurality of spaced, parallel plates disposed perpendicularly to said first plurality of plates.

7. The method of claim 1 wherein said molecules include a gaseous compound of uranium including a halogen compound.

8. The method of claim 7 wherein said compound is $UF_6$.

9. The method of claim 1 wherein said flow of molecules is subsonic.

10. The method of claim 1 wherein said step of producing vibrational excitation of said molecules includes the step of applying radiant energy to said flowing environment with a frequency and bandwidth which induces vibrational excitation of molecules of said flow with isotopic selectivity.

11. The method of claim 10 wherein the radiant energy applying step includes the step of applying laser energy.

12. The method of claim 11 wherein the step of applying laser energy comprises applying laser energy from a first laser with output having a first flux density and applying laser energy from a second laser, similarly tuned as said first laser and having an output flux density substantially greater than the output flux density of the first laser.

13. The method of claim 11 wherein said molecules include $UF_6$ and the laser is tuned to an absorption line for 235-$UF_6$ near 16 microns.

14. The method of claim 12 wherein said laser energy includes radiation from a lead salt diode laser.

15. The method of claim 12 wherein said laser energy includes radiation from a carbon dioxide laser.

16. The method of claim 12 wherein said laser energy is applied over a region substantially coextensive with the dimer formation region to ensure sufficient time for the molecules having an isotope other than the predetermined isotope type to aggregate and to provide multiple excitations of molecules of the predetermined isotope type, to replace energy lost by vibrational deactivation of such molecules while the other molecules aggregate.

17. The method of claim 1 further including the steps of:
repeating the inducing and aggregating steps on molecules enriched in the predetermined isotope; and
repeating separately on the molecules depleted in the predetermined isotope the inducing and aggregating steps.

18. The method of claim 1 wherein the aggregating inducing step includes cooling a flowing gas by expansion from a nozzle.

19. The method of claim 1 further including the step of introducing molecules of a substantially inert, carrier gas into said flowing environment of molecules.

20. The method of claim 19 wherein said carrier gas is a noble gas.

21. The method of claim 19 wherein said carrier gas introducing step includes introducing said gas at a temperature below the temperature of said molecules for accomplishing said step of inducing aggregation.

22. A method for producing a separation among molecular particles having at least one uranium atom of plural isotope types, the method comprising the steps of:
establishing the flowing environment of the molecules having the uranium atom of plural isotope types;
controlling the temperature of the flowing environment to a temperature above condensation, but sufficiently low to provide significant populations of the molecules in low vibrational energy states;
cooling the flowing molecules to induce the aggregation of clusters of molecules; and
illuminating the flowing molecules in the region wherein they are being cooled, with electromagnetic radiation of spectral content to vibrationally excite the molecules having U-235 atoms without corresponding excitation of molecules having another uranium isotope type whereby the formation of dimers and larger clusters of molecules having U-235 atoms is inhibited.

23. The method of claim 22 further including the steps of:
collecting the molecules enriched in the U-235 atom in a product stream; and
collecting the molecules depleted in the U-238 atom in a waste stream.

24. Apparatus for producing isotopic separation among molecules having plural isotopes in an atom comprising:
means for establishing a flowing environment of the molecules having atoms thereof present in several isotope types;
means for inducing isotopically selective vibrational excitation of the molecules of said flowing environment so as to produce molecular vibration of molecules having an atom of a predetermined isotope type without correspondingly inducing vibration of molecules having an atom of another isotope type; and
means for inducing aggregation of molecules having atoms of other than the predetermined isotope type to form clusters of such molecules while substantially avoiding the formation of dimers and larger clusters of molecules having an atom of the predetermined vibrationally excited isotope type, whereby the selectively excited molecules predominate in monomers.

25. The apparatus of claim 24 wherein said molecules include a gaseous compound of uranium.

26. The apparatus of claim 24 wherein said flow of molecules is subsonic.

27. The apparatus of claim 24 including means for applying radiant energy to said environment flow with a frequency and bandwidth which induces vibrational excitation of molecules of said flow with isotopic selectivity.

28. The apparatus of claim 27 wherein the radiant energy applying means includes laser means.

29. The apparatus of claim 28 wherein said laser means includes a laser tuned to at least one absorption line for 235-$UF_6$ near 16 microns.

30. The apparatus of claim 24 further including means for segregating vibrationally excited molecules having an atom of a predetermined isotope type from the flow of said molecules of plural isotope types.

31. The apparatus of claim 30 wherein:
said vibrationally excited molecules include $UF_6$; and
said vibrational excitation inducing means includes means for applying infrared laser radiation to the flowing particles.

32. Apparatus for producing separation among molecular particles having at least one uranium atom of plural isotope types comprising:
means for establishing a flowing environment of the molecules having the uranium atom of the plural isotope types;
means for controlling the temperature of the flowing environment to a temperature above condensation but sufficiently low to provide significant populations of the molecules in low vibrational energy states;
means for cooling the flowing molecules to induce dimerization and further aggregation of molecules;
means for illuminating the cooled molecules in the flowing environment prior to aggregation with electromagnetic radiation of spectral content to vibrationally excite the molecules having U-235 atoms without corresponding excitation of molecules having another uranium isotope type whereby the unexcited molecules selectively aggregate while the excited molecules remain unaggregated;

means for collecting the vibrationally excited molecules in a product stream of molecules enriched in the U-235 atom; and means for collecting the non-vibrationally excited, dimers and larger aggregate clusters of molecules as a waste stream depleted in the U-238 atom.

33. Apparatus for producing separation among molecules having plural isotopes in an atom comprising:

means establishing a cooled, flowing environment of the molecules having atoms thereof present in several isotope types;

a chamber having:

means for introducing said flowing environment of molecules into a first end of the chamber;

means for introducing a carrier gas into the first end of the chamber at a temperature below the condensation point of the molecules in the flowing environment to mix with and induce aggregation in such molecules;

the chamber having a second end maintained at a lower temperature than said first end thereof;

means for inducing isotopically selective vibrational excitation of the molecules within the chamber so as to produce molecular vibration of molecules having an atom of a predetermined isotope type without correspondingly inducing vibration of molecules having an atom of another isotope type and to thereby inhibit aggregration of the molecules of predetermined isotope type while the other molecules aggregate in response to said carrier gas, means for collecting the vibrationally excited molecules having atoms of the predetermined isotope type;

means for collecting the aggregated molecules having atoms of other than the predetermined isotope type;

means for collecting molecules of the carrier gas at the second end of the chamber;

means for isolating said means for collecting vibrationally excited molecules of the predetermined isotope type from said means for collecting aggregated molecules of other than the predetermined isotope type to permit independent removal from the chamber of molecules containing atoms of the predetermined isotope type and molecules containing atoms of other than the predetermined isotope type; and means for isolating said means for collecting molecules of the carrier gas from said means for collecting the vibrationally excited molecules and means for collecting the aggregated molecules.

34. The apparatus of claim 33 wherein the means for inducing isotopically selective vibrational excitation includes means for applying radiant energy to the molecules disposed within the chamber with a frequency and bandwidth which induces vibrational excitation of said molecules with isotopic selectivity.

35. The apparatus of claim 34 wherein the radiant energy applying means includes laser means.

36. The apparatus of claim 35 wherein said molecules include gaseous uranium hexafluoride and said laser means includes a laser tuned to at least one absorption line for 235 UF$_6$ near 16 microns.

37. The apparatus of claim 36 wherein said laser means includes a first laser with an output having a first flux density and a second laser with an output having a second flux density, said second flex density being substantially greater than said first flux density.

38. The apparatus of claim 37 wherein the output of said first laser is applied over a region substantially coextensive with the dimer formation region to insure sufficient time for the molecules having an isotope other than the predetermined isotope to aggregate while providing multiple excitations of molecules of the predermined isotope type, to replace energy lost by vibrational deactivation of such molecules as the molecules having an isotope other than the predetermined isotope aggregate.

39. Apparatus for producing separation among molecules having plural isotopes in an atom comprising:

means for establishing a cooled, flowing environment of the molecules having atoms thereof present in several isotope types;

first and second chambers each having:

means for introducing said flowing environment of molecules into a first end of the chamber;

means for introducing a carrier gas into the first end of the chamber at a first cryogenic temperature below the condensation point of the molecules in the flowing environment to mix with and induce aggregation in such molecules;

means for inducing isotopically selective vibrational excitation of the molecules within the chamber so as to produce molecular vibration of molecules having an atom of a predetermined isotope type without correspondingly inducing vibration of molecules having an atom of another isotope type and thereby to inhibit aggregation of the molecules of predetermined isotope type while the other molecules aggregate in response to said carrier gas.

means for collecting the vibrationally excited molecules having atoms of the predetermined isotope type;

means for collecting aggregated molecules having atoms of other than the predetermined isotope type;

means for collecting molecules of the carrier gas at the second end of the chamber;

means for isolating said means for collecting vibrationally excited molecules of the predetermined isotope type from said means for collecting aggregated molecules of other than the predetermined isotope type to permit independent removal from the chamber of molecules containing atoms of the predetermined isotope type and molecules containing atoms of other than the predetermined isotope type; and means for isolating said means for collecting molecules of the carrier gas from said means for collecting the vibrationally excited molecules and means for collecting the aggregated molecules;

one of said chambers having a second end maintained at a lower temperature than said first end thereof; and valve means operable to connect a first end of one of the first or second chambers to the second end of the other chamber.

40. The apparatus of claim 39 wherein the means for inducing isotopically selective vibrational excitation includes means for applying radiant energy to the molecules disposed within the chamber with a frequency and bandwidth which induces vibrational excitation of said molecules with isotopic selectivity.

41. The apparatus of claim 40 wherein the radiant energy applying means includes laser means.

42. The apparatus of claim 41 wherein said molecules include gaseous uranium hexafluoride and said laser means includes a laser tuned to at least one absorption line for 235 UF$_6$ near 16 microns.

43. The apparatus of claim 42 wherein said laser means includes a first laser with an output having a first flux density and a second laser with an output having a second flux density, said second flux density being substantially greater than said first flux density.

44. The apparatus of claim 43 wherein the output of said first laser is applied over a region substantially coextensive with the dimer formation region to insure sufficient time for the molecules having an isotope other than the predetermined isotope to aggregate while providing multiple excitation of molecules of the pedetermined isotope type, to replace energy lost by vibrational deactivation of such molecules as the molecules having an isotope other than the predetermined isotope aggregate.

45. The apparatus of claim 39 wherein said means for collecting molecules having atoms of the predetermined isotope type comprises a plurality of substantially parallel plates disposed near said excitation inducing means.

46. The apparatus of claim 45 wherein said collecting means further comprises first and second mutually perpendicular pluralities of substantially parallel plates.

47. The apparatus of claim 39 further including means for removing collected molecules having atoms of the predetermined isotope type.

48. The apparatus of claim 47 further including means for removing aggregated molecules having atoms of other than the predetermined isotope type.

49. The apparatus of claim 39 further including means for removing collected molecules of the carrier gas from the second end of one of the chambers and for introducing such molecules into the first end of the other chambers.

50. The apparatus of claim 39 wherein one of said chambers is used for collecting molecules having atoms of the predetermined isotope type while previously collected molecules having atoms of the predetermined isotope type are removed from the other of said chambers.

51. A method for producing isotopic separation among molecules having an atom present in plural isotope types, comprising:
 a first set of steps operative within one of first and second chambers and comprising the steps of estblishing a flowing environment for the molecules having an atom thereof present in several isotope types, inducing isotopically selective excitation of said molecules so as to produce excitation of molecules having an atom of a predetermined isotope type without correspondingly exciting molecules not having an atom of said predetermined isotope type, and collecting the excited molecules having an atom of the predetermined isotope type apart from other molecules of said flowing environment;
 a second set of one or more steps operative within the other of said first and second chambers and comprising removing molecules previously collected within said other chamber in accordance with said first set of steps; and
 repeating said first and second sets of steps on opposite ones of said second and first chambers respectively;
 the step of collecting molecules having an atom of a predetermined isotope type comprising, in addition to inducing isotopically selective vibrational excitation in said molecules:
 inducing aggregation of the flowing molecules having atoms of an isotope other than the predetermined isotope type to form clusters of such molecules while substantially avoiding the formation of dimers and larger clusters of molecules having an atom of the predetermined isotope type, whereby the selectively excited molecules predominate in monomers; and
 separating the selectively excited monomers from the flowing environment of molecules.

52. The method of claim 51 wherein the selectively excited monomers are separated from the flowing environment of molecules onto a plurality of substantially parallel plates.

53. The method of claim 51 wherein the flowing environment of molecules including molecules of a substantially inert, carrier gas.

54. The method of claim 53 including the further step of circulating said carrier gas through said first and second chambers.

55. The method of claim 53 wherein the carrier gas is supplied to one of said first and second chambers from the other of said chambers.

56. The method of claim 51 further including repeating the steps thereof a plurality of times.

57. The method of claim 51 wherein said first and second sets of steps are operative simultaneously on different ones of said first and second chambers.

58. The method of claim 51 wherein said second set of steps includes the step of removing the molecules other than the collected molecules having atoms of the predetermined isotope type from said other chamber.

59. The method of claim 58 including a plurality of stages each including at least one each of said first and second chambers and including the steps of:
 applying removed, collected molecules of one of the first and second chambers of a first stage to the flowing environment of one of the first and second chambers of a second stage; and
 applying the removed other molecules from said one chamber of said first stage to the flowing environment of one of the first and second chambers of a third stage.

* * * * *